US012570312B2

(12) United States Patent
Shimizu

(10) Patent No.: US 12,570,312 B2
(45) Date of Patent: Mar. 10, 2026

(54) PROCESSING SYSTEM, PROCESSING DEVICE, AND PROCESSING METHOD

(71) Applicant: DENSO CORPORATION, Kariya-city (JP)

(72) Inventor: Shun Shimizu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 130 days.

(21) Appl. No.: 18/408,213

(22) Filed: Jan. 9, 2024

(65) Prior Publication Data

US 2024/0140477 A1 May 2, 2024

Related U.S. Application Data

(63) Continuation of application No. PCT/JP2022/024209, filed on Jun. 16, 2022.

(30) Foreign Application Priority Data

Jul. 12, 2021 (JP) ................................. 2021-115163

(51) Int. Cl.
B60W 50/06 (2006.01)
B60W 60/00 (2020.01)
(52) U.S. Cl.
CPC .......... B60W 60/001 (2020.02); B60W 50/06 (2013.01); B60W 2554/40 (2020.02); B60W 2556/35 (2020.02)
(58) Field of Classification Search
CPC ............... B60W 60/001; B60W 50/06; B60W 2554/40; B60W 2556/35; B60W 30/0956; B60W 2554/4041; B60W 60/0015; G06T 7/00; G08G 1/16
See application file for complete search history.

(56) References Cited

U.S. PATENT DOCUMENTS

2010/0226532 A1     9/2010  Hayasaka et al.
2023/0260147 A1*   8/2023  Kido ..................... G06T 7/0004
                                                                    382/103

FOREIGN PATENT DOCUMENTS

CN         113525358 A  * 10/2021  .......... B60W 60/001
JP         2017-187856 A   10/2017
JP         2020-046762 A   3/2020
JP    WO2020009060 A1 *  8/2021  ........... G01S 13/865

OTHER PUBLICATIONS

Yoshimitsu Murahashi et al., Mar. 30, 2020 English Machine Translation_CN113525358A provided by Patent Translate by EPO and Google (Year: 2020).*
Shinji Igarashi, Jul. 2, 2018 English Machine Translation_ JPWO2020009060A1 provided by Patent Translate by EPO and Google (Year: 2018).*

* cited by examiner

*Primary Examiner* — Ashley L Redhead, Jr.
(74) *Attorney, Agent, or Firm* — Maschoff Brennan

(57) ABSTRACT

A processing system including a processor is configured to perform recognition-related processing related to recognition of a target movable body for a host movable body. The processor is configured to execute acquiring a recognition rate of recognizing a target movable body for each of a plurality of recognition models, and fusing recognition data by each of the plurality of recognition models according to a fusion rate based on a recognition score.

17 Claims, 11 Drawing Sheets

FIG. 4

( PROCESSING FLOW )

IDENTIFY TRAVELING AREA ～ S101

ACQUIRE PROBABILITY DISTRIBUTION ～ S102

ACQUIRE RECOGNITION RATE ～ S103

ACQUIRE RECOGNITION DATA ～ S104

FUSE RECOGNITION DATA ACCORDING TO FUSION RATE BASED ON RECOGNITION SCORE CORRELATED WITH RECOGNITION RATE AND PROBABILITY DISTRIBUTION ～ S105

SET CONSTRAINT OF ODD ～ S106

( END )

FIG. 5

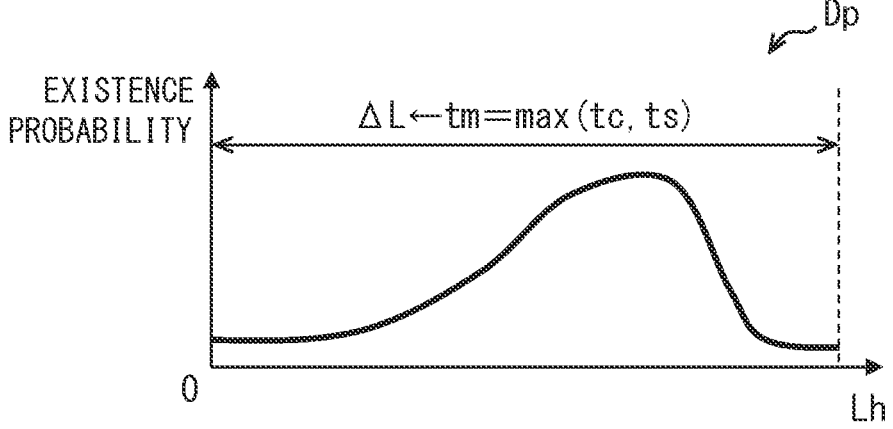

$\Delta L \leftarrow tm = max(tc, ts)$

EXISTENCE PROBABILITY

Dp

0

Lh

|  | tc [s] | |
| --- | --- | --- |
|  | MAJOR ROAD TWO LANES | MAJOR ROAD FOUR LANES |
| TURN RIGHT OR LEFT FROM MAJOR ROAD | 4.1 | 4.1 |
| TURN RIGHT OR LEFT FROM MINOR ROAD | 6.2 | 6.9 |
| STRAIGHT ON MINOR ROAD | 6.5 | 6.5 |

FIG. 16

| | | REAL WORLD | |
|---|---|---|---|
| | | PRESENCE | ABSENCE |
| RECOG-NITION | PRESENCE | TP | FP |
| | ABSENCE | FN | TN |

| OPERATION | $J=\sum \omega n \cdot S\hat{}n$ |
|---|---|
| C1 | max(J(TP+TN)) or min(1/J(TP+TN)) |
| C2 | max(1/J(FP+FN)) or min(J(FP+FN)) |
| C3 | max(1/J(FP)) or min(J(FP)) |
| C4 | max(1/J(FN)) or min(J(FN)) |
| C5 | max(J(TP+TN)+1/J(FP+FN)) or min(1/J(TP+TN)+J(FP+FN)) |
| C6 | max(J(TP+TN)+1/J(FP)) or min(1/J(TP+TN)+J(FP)) |
| C7 | max(J(TP+TN)+1/J(FN)) or min(1/J(TP+TN)+J(FN)) |

PROCESSING SYSTEM, PROCESSING DEVICE, AND PROCESSING METHOD

CROSS-REFERENCE TO RELATED APPLICATIONS

The present application is a continuation application of International Patent Application No. PCT/JP2022/024209 filed on Jun. 16, 2022 which designated the U.S. and claims the benefit of priority from Japanese Patent Application No. 2021-115163 filed on Jul. 12, 2021. The entire disclosures of all of the above applications are incorporated herein by reference.

TECHNICAL FIELD

The present disclosure relates to a technology for performing recognition-related processing related to the recognition of a target movable body in a host movable body.

BACKGROUND

The technique disclosed in a related art uses a plurality of dictionaries as recognition models to recognize a pedestrian as a target movable body in a vehicle as a host movable body.

SUMMARY

According to example, a processing system including a processor is configured to perform recognition-related processing related to recognition of a target movable body for a host movable body. The processor is configured to execute acquiring a recognition rate of recognizing a target movable body for each of a plurality of recognition models, and fusing recognition data by each of the plurality of recognition models according to a fusion rate based on a recognition score.

BRIEF DESCRIPTION OF DRAWINGS

Objects, features and advantages of the present disclosure will become more apparent from the following detailed description made with reference to the accompanying drawings. In the drawings:

FIG. 4 is a flowchart showing a processing flow according to one embodiment;

FIG. 5 is a graph for illustrating a probability distribution according to one embodiment;

FIG. 16 is a characteristic table for illustrating a recognition rate according to one embodiment;

DETAILED DESCRIPTION

Figure 1:
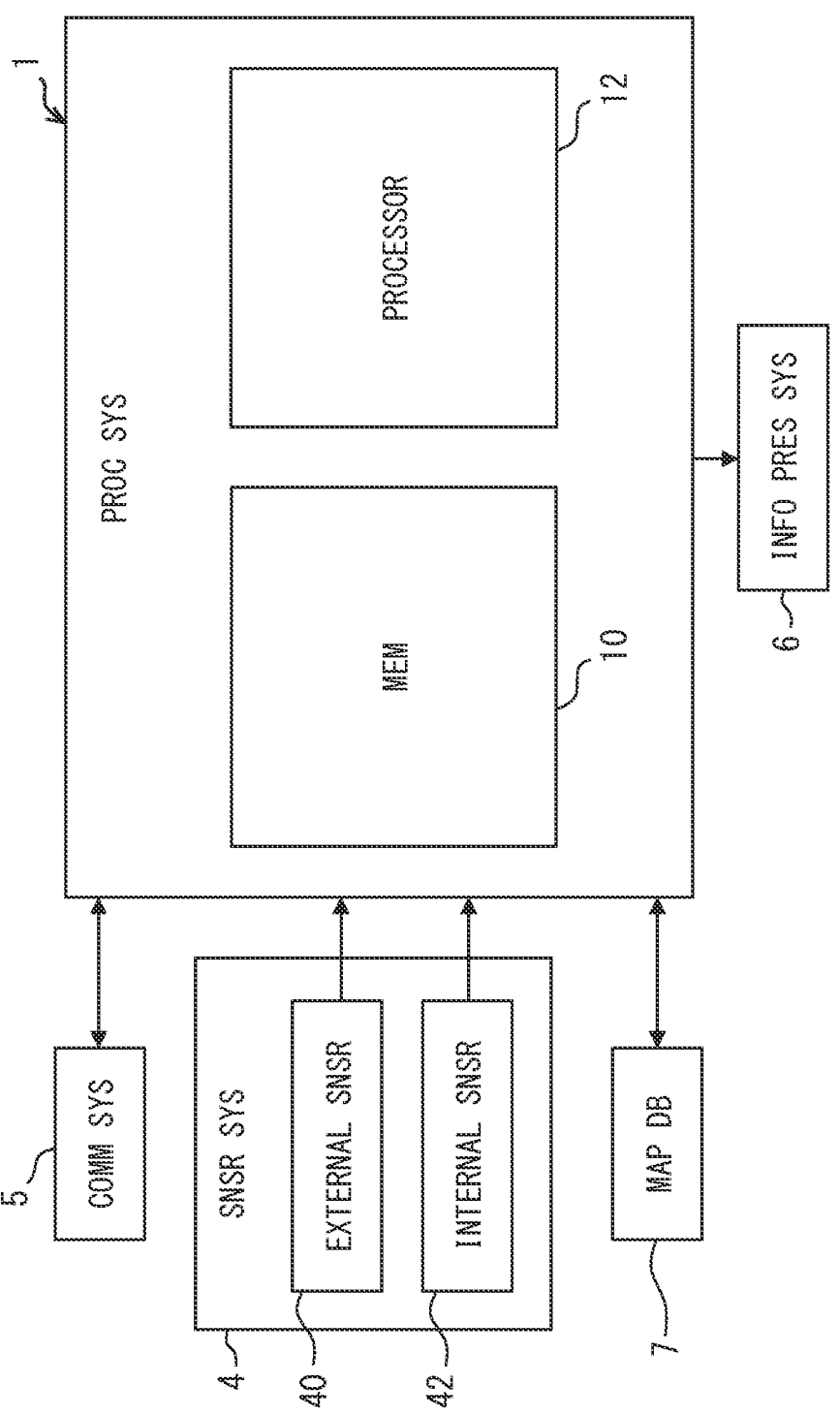
FIG. 1 is a block diagram showing an overall configuration of one embodiment.

In the technique disclosed in a related art, a dictionary having the lowest resolution is searched and selectively used to reduce the calculation time. However, since the request recognition performance required for the dictionary changes according to the traveling area of the vehicle, it may be difficult to secure the recognition accuracy only by the recognition based on the dictionary having the lowest resolution.

The present disclosure provides a processing system that secures the recognition accuracy of a target movable body in a host movable body. Also, the present disclosure provides a processing device that secures the recognition accuracy of a target movable body in a host movable body. The present disclosure provides a processing method that secures the recognition accuracy of a target movable body in a host movable body. The present disclosure provides a processing program that secures the recognition accuracy of a target movable body in a host movable body.

Hereinafter, a technical means of the present disclosure for solving the problem will be described.

According to one aspect of the present disclosure, a processing system comprising a processor, the processing system configured to perform recognition-related processing related to recognition of a target movable body for a host movable body, is provided.

The processor is configured to execute acquiring a probability distribution of the target movable body being present with respect to a distance from the host movable body according to a traveling area of the host movable body, acquiring a recognition rate of recognizing the target movable body for each of a plurality of recognition models, and fusing recognition data by each of the plurality of recognition models according to a fusion rate based on a recognition score correlated with the recognition rate and the probability distribution for each of the plurality of recognition models.

According to one aspect of the present disclosure, a processing system comprising a processor, the processing system configured to perform recognition-related processing related to recognition of a target movable body in a host movable body, is provided. The processor is configured to execute acquiring a recognition rate that is at least one type out of a matching degree and a mismatching degree of recognition with respect to reality for each of a plurality of recognition models that recognize the target movable body, and fusing recognition data by each of the plurality of recognition models according to a fusion rate based on the recognition rate for each of the plurality of recognition models.

According to one aspect of the present disclosure, a processing device comprising a processor is provided. The processing device is configured to be mounted on a host movable body, and the processing device is configured to perform recognition-related processing related to recognition of a target movable body in the host movable body.

The processor is configured to execute acquiring a probability distribution of the target movable body being present with respect to a distance from the host movable body according to a traveling area of the host movable body, acquiring a recognition rate of recognizing the target movable body for each of a plurality of recognition models, and fusing recognition data by each of the plurality of recognition models according to a fusion rate based on a recognition score correlated with the recognition rate and the probability distribution for each of the plurality of recognition models.

According to one aspect of the present disclosure, a processing device comprising a processor is provided. The processing device is configured to be mounted on a host movable body, and the processing device is configured to perform recognition-related processing related to recognition of a target movable body in the host movable body.

The processor is configured to execute acquiring a recognition rate that is at least one type out of a matching degree and a mismatching degree of recognition with respect to reality for each of a plurality of recognition models that recognize the target movable body, and fusing recognition data by each of the plurality of recognition models according to a fusion rate based on the recognition rate for each of the plurality of recognition models.

According to one aspect of the present disclosure, a non-transitory computer readable storage medium storing a processing program stored in a storage medium to perform recognition-related processing related to recognition of a target movable body in a host movable body is provided. The processing program comprises a command to cause a processor to execute. The command includes causing the processor to acquire a probability distribution of the target movable body being present with respect to a distance from the host movable body according to a traveling area of the host movable body, causing the processor to acquire a recognition rate of recognizing the target movable body for each of a plurality of recognition models, and causing the processor to fuse recognition data by each of the plurality of recognition models according to a fusion rate based on a recognition score correlated with the recognition rate and the probability distribution for each of the plurality of recognition models.

According to one aspect of the present disclosure, a non-transitory computer readable storage medium storing a processing program stored in a storage medium to perform recognition-related processing related to recognition of a target movable body in a host movable body is provided. The processing program comprises a command to cause a processor to execute. The command includes causing the processor to acquire a recognition rate that is at least one type out of a matching degree and a mismatching degree of recognition with respect to reality for each of a plurality of recognition models that recognize the target movable body, and causing the processor to fuse recognition data by each of the plurality of recognition models according to a fusion rate based on the recognition rate for each of the plurality of recognition models.

According to these aspects, the probability distribution of the target movable body being present with respect to the distance from the host movable body is acquired according to the traveling area of the host movable body. Therefore, in the first to fourth aspects, according to the fusion rate based on the recognition score correlated with the recognition rate and above-described acquired probability distribution for each of the plurality of recognition models that recognize the target movable body, the recognition data by each of the recognition models is fused. According to this, even if the request recognition performance obtained according to the traveling area changes, appropriate fusion can be achieved by following the fusion rate adjusted to the recognition score in which the probability distribution can reflect the change. Therefore, the recognition accuracy of the target movable body in the host movable body can be secured.

Hereinafter, an embodiment of the present disclosure will be described with reference to the drawings.

Figure 2:
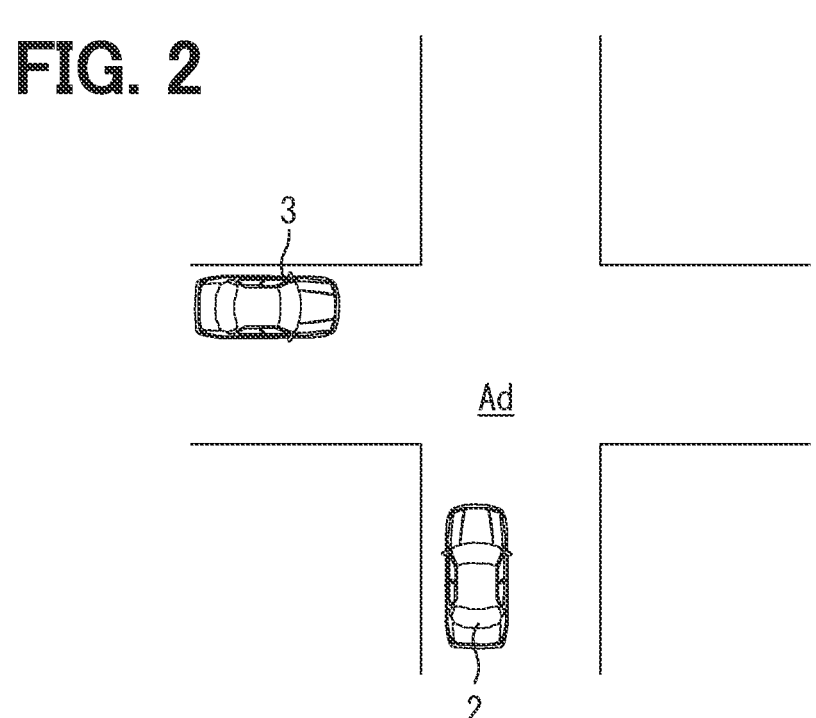
FIG. 2 is a schematic diagram showing a traveling environment of a host vehicle to which one embodiment is applied.

A processing system 1 according to an embodiment shown in FIG. 1 performs recognition-related processing related to recognition of a target movable body 3 in a host vehicle 2 being a host movable body shown in FIG. 2. From the viewpoint centering on the host vehicle 2, it can also be said that the host vehicle 2 is an ego-vehicle. The host vehicle 2 is a movable body such as an automobile that can travel on a traveling path in a boarding state of an occupant. From the viewpoint centering on the host vehicle 2, it can also be said that the target movable body 3 is another road user. The target movable body 3 includes at least one type out of, for example, an automobile, a motorcycle, a bicycle, an autonomous traveling robot, a pedestrian, an animal, and the like.

In the host vehicle 2, an automated driving mode is provided, which is to be classified by level according to the manual intervention degree of the occupant in the driving task. The automated driving mode may be achieved by autonomous traveling control in which the system at the time of operation executes all driving tasks, such as conditional driving automation, advanced driving automation, or complete driving automation. The automated driving mode may be achieved by advanced driving support control in which an occupant executes some or all driving tasks, such as driving support or partial driving automation. The automated driving mode may be achieved by any one, combination, or switching of the autonomous traveling control and the advanced driving support control.

The host vehicle 2 is mounted with a sensor system 4, a communication system 5, an information presentation system 6, and a map database 7 shown in FIG. 1. The sensor system 4 acquires sensor information available by the processing system 1 by detecting the outside world and the inside world of the host vehicle 2. To that end, the sensor system 4 includes an external sensor 40 and an internal sensor 42.

The external sensor 40 acquires outside world information, as sensor information, from the outside world serving as the surrounding environment of the host vehicle 2. The external sensor 40 may acquire outside-world information by detecting a target present in the outside world of the host vehicle 2. The external sensor 40 of a target detection type is at least one type out of, for example, a camera, Light Detection and Ranging/Laser Imaging Detection and Ranging (LiDAR), a radar, a sonar, and the like.

The internal sensor 42 acquires inside-world information available by the processing system 1 from the inside world serving as the internal environment of the host vehicle 2. The internal sensor 42 may acquire the inside-world information by detecting a specific motion physical quantity in the inside world of the host vehicle 2. The internal sensor 42 of a physical quantity detection type is at least one type out of, for example, a traveling speed sensor, an acceleration sensor, a gyro sensor, and the like. The internal sensor 42 may acquire inside-world information by detecting the specific state of the occupant in the inside world of the host vehicle 2. The internal sensor 42 of an occupant detection type is, for example, at least one type out of a Driver Status Monitor (registered trademark), a biological sensor, a seating sensor, an actuator sensor, a vehicle interior apparatus sensor, and the like.

The communication system 5 acquires communication information available by the processing system 1 by wireless communication. The communication system 5 may receive a positioning signal from an artificial satellite including a global navigation satellite system (GNSS) present in the outside world of the host vehicle 2. The communication system 5 of a positioning type is, for example, a GNSS receiver or the like. The communication system 5 may transmit and receive a communication signal to and from a V2X system present in the outside world of the host vehicle 2. The communication system 5 of a V2X type is, for example, at least one type out of a dedicated short range communications (DSRC) communication device, a cellular V2X (C-V2X) communication device, and the like. The communication system 5 may transmit and receive a communication signal to and from a terminal present in the inside world of the host vehicle 2. The communication system 5 of a terminal communication type is at least one type out of, for example, a Bluetooth (registered trademark) apparatus, a Wi-Fi (registered trademark) apparatus, an infrared communication apparatus, and the like.

The information presentation system 6 presents notification information to an occupant of the host vehicle 2. The information presentation system 6 may present the notification information by stimulating the visual sense of the occupant. The information presentation system 6 of a visual stimulus type is at least one type out of, for example, a head-up display (HUD), a multi-function display (MFD), a combination meter, a navigation unit, a light-emitting unit, and the like. The information presentation system 6 may present the notification information by stimulating the auditory sense of the occupant. The information presentation system 6 of an auditory stimulus type is at least one type out of, for example, a speaker, a buzzer, a vibration unit, and the like.

The map database 7 stores map information available by the processing system 1. The map database 7 includes at least one type of non-transitory tangible storage medium out of, for example, a semiconductor memory, a magnetic medium, an optical medium, and the like. The map database 7 may be a database of locators that estimate the self-state quantity including the self-location of the host vehicle 2. The map database 7 may be a database of a navigation unit that navigates the traveling route of the host vehicle 2. The map database 7 may be configured by a combination of a plurality of types out of these databases and the like.

The map database 7 acquires and stores the latest map information by, for example, communication with an external center via the V2X-type communication system 5. Here, the map information is converted into two-dimensional or three-dimensional data as information indicating the traveling environment of the host vehicle 2. In particular, digital data of a high-precision map is advisable to be adopted as the three-dimensional map data. The map information may include road information indicating at least one type out of, for example, a location, a shape, a road surface condition, and the like of the road itself. The map information may include indication information indicating at least one type out of, for example, the positions and shapes of a sign and a division line attached to a road. The map information may include structure information indicating at least one type out of, for example, a location, a shape, and the like of a building and a traffic light which face a road.

The processing system 1 is connected to the sensor system 4, the communication system 5, the information presentation system 6, and the map database 7 via at least one type out of, for example, a local area network (LAN) line, a wire harness, an internal bus, a wireless communication line, and the like. The processing system 1 includes at least one dedicated computer.

The dedicated computer constituting the processing system 1 may be a driving control electronic control unit (ECU) that controls the driving of the host vehicle 2. The dedicated computer constituting the processing system 1 may be a navigation ECU that navigates the traveling route of the host vehicle 2. The dedicated computer constituting the processing system 1 may be a locator ECU that estimates a self-state quantity of the host vehicle 2. The dedicated computer constituting the processing system 1 may be an actuator ECU that controls a traveling actuator of the host vehicle 2. The dedicated computer constituting the processing system 1 may be a human-machine interface (HMI) control unit (HCU) that controls information presentation by the information presentation system 6 in the host vehicle 2. The dedicated computer constituting the processing system 1 may be a computer other than the host vehicle 2, constituting an external center, a mobile terminal, or the like, capable of communicating via the V2X-type communication system 5, for example.

The dedicated computer constituting the processing system 1 includes at least one memory 10 and one processor 12. The memory 10 is at least one type of non-transitory tangible storage medium out of, for example, a semiconductor memory, a magnetic medium, an optical medium, and the like that non-transitorily store a computer readable program, data, and the like. The processor 12 includes, as a core, at least one type out of, for example, a central processing unit (CPU), a graphics processing unit (GPU), a reduced instruction set computer (RISC)-CPU, a data flow processor (DFP), a graph streaming processor (GSP), and the like.

Figure 3:
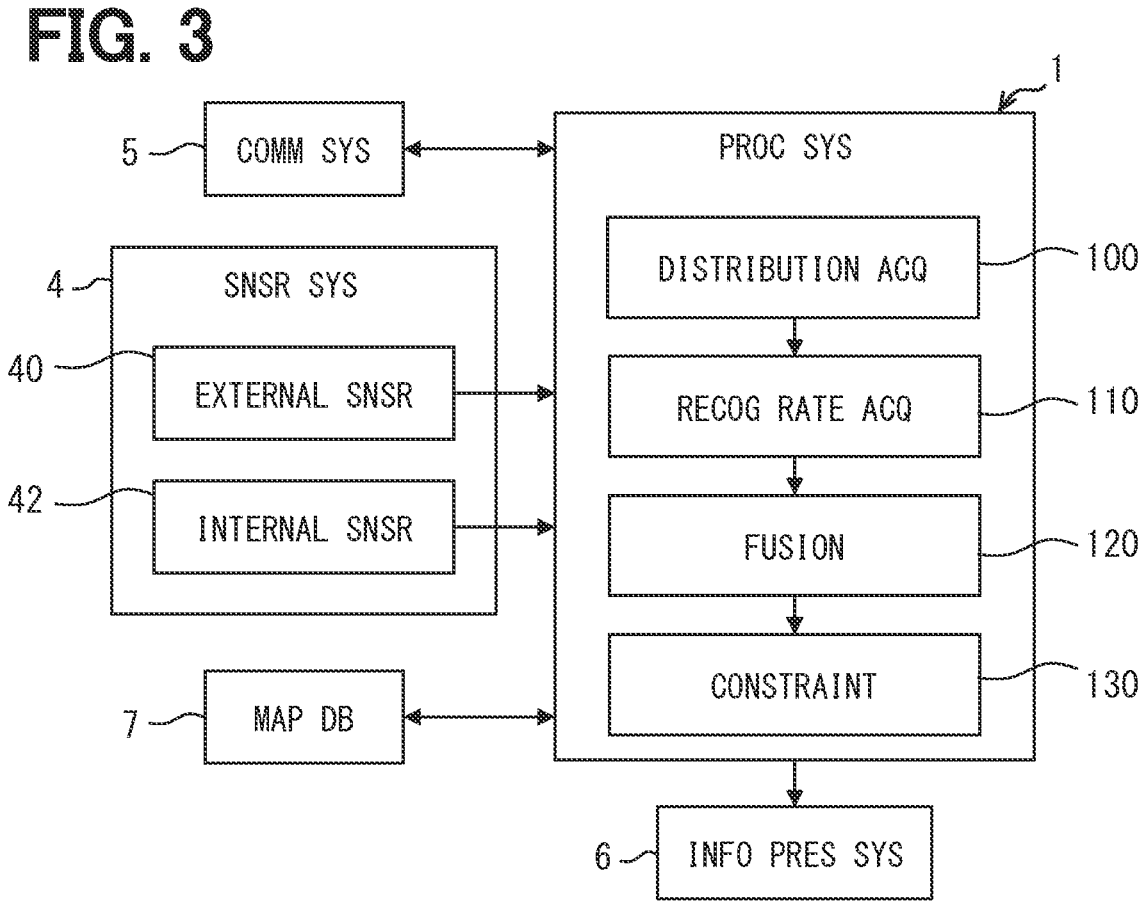
FIG. 3 is a block diagram showing a functional configuration of a processing system according to one embodiment.

In the processing system 1, the processor 12 executes a plurality of commands included in the processing program stored in the memory 10 in order to perform the recognition-related processing in the host vehicle 2. Accordingly, the processing system 1 constructs a plurality of functional blocks for performing the recognition-related processing in the host vehicle 2. As shown in FIG. 3, the plurality of functional blocks constructed in the processing system 1 includes a distribution acquisition block 100, a recognition rate acquisition block 110, a fusion block 120, and a constraint block 130.

With the cooperation of these blocks 100 and 110, a processing method for the processing system 1 to perform the recognition-related processing in the host vehicle 2 is executed according to the processing flow shown in FIG. 4. The present processing flow is repeatedly executed during activation of the host vehicle 2. Each "S" in the present processing flow means a corresponding one of a plurality of steps executed by a plurality of commands included in the processing program.

In step S101 of the processing flow, the distribution acquisition block 100 determines the traveling scene including the self-location of the host vehicle 2 based on the acquired or stored information of the sensor system 4, the communication system 5, and the map database 7 to identify a traveling area Ad (see FIG. 2) of the host vehicle 2. At this time, the traveling area Ad is identified as an area of a distance range in which the host vehicle 2 needs to recognize the target movable body 3 on the left and right in the lateral direction and the front and rear in the longitudinal direction of the host vehicle 2.

In step S102 of the processing flow, the distribution acquisition block 100 acquires a probability distribution Dp of the target movable body 3 being present with respect to a distance Lh from the host vehicle 2 according to the traveling area Ad of the host vehicle 2 as shown in FIG. 5.

Figure 6:
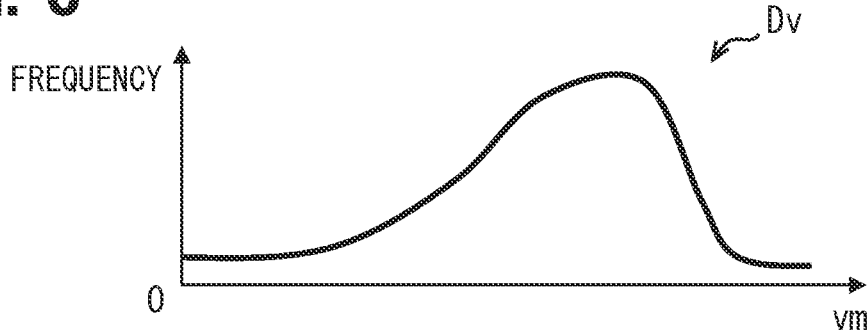
FIG. 6 is a graph for illustrating a speed distribution according to one embodiment.
Figure 7:
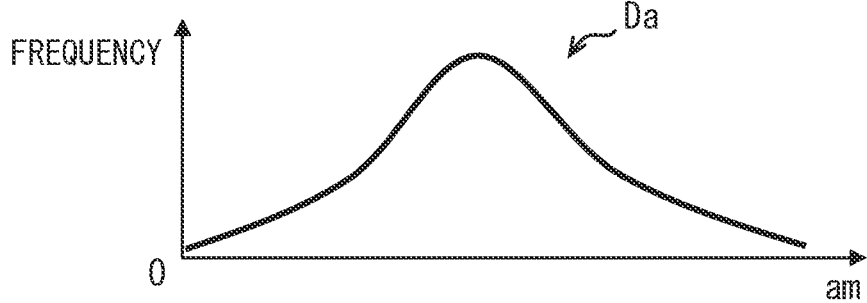
FIG. 7 is a graph for illustrating an acceleration distribution according to one embodiment.
Figure 8:
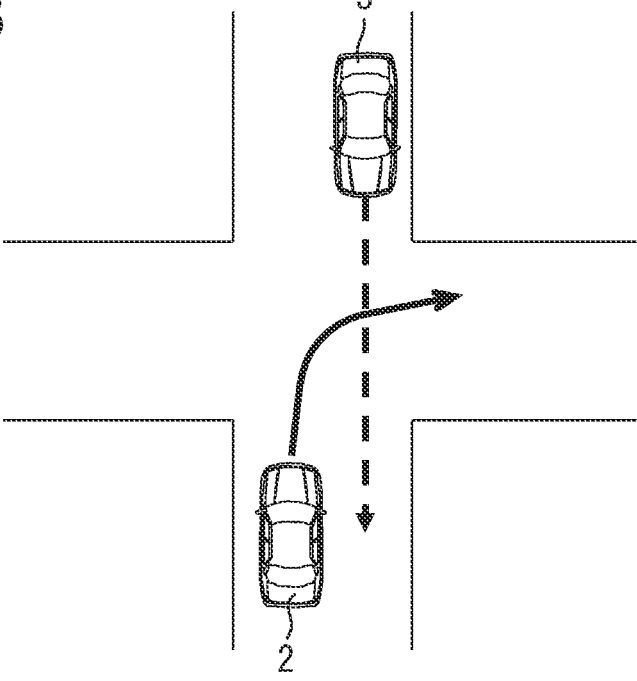
FIG. 8 is a schematic diagram showing a track-intersecting scene according to one embodiment.
Figure 9:
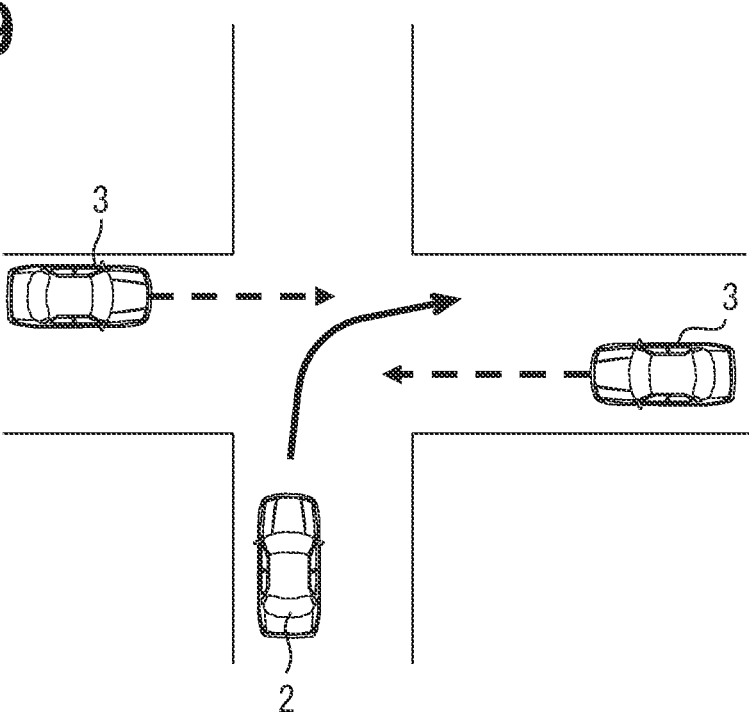
FIG. 9 is a schematic diagram showing a track-intersecting scene according to one embodiment.
Figure 10:
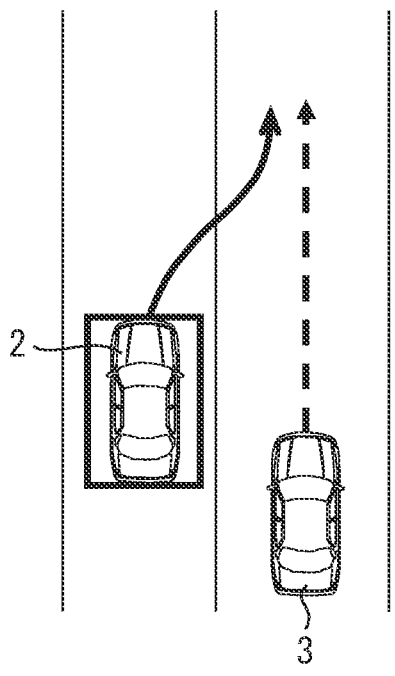
FIG. 10 is a schematic diagram showing a track-intersecting scene according to one embodiment.
Figure 11:
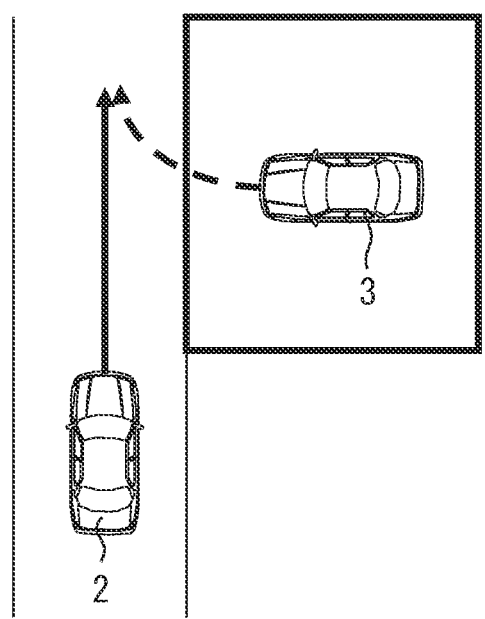
FIG. 11 is a schematic diagram showing a track-intersecting scene according to one embodiment.

Specifically, the distribution acquisition block 100 in S102 acquires a speed distribution Dv representing a situation in which a speed vm of the movable body in the traveling area Ad is continuously dispersed or intermittently dispersed (that is, histogram dispersion) as shown in FIG. 6 based on the acquired or stored information of the sensor system 4, the communication system 5, and the map database 7. At the same time, the distribution acquisition block 100 in S102 acquires an acceleration distribution Da representing a situation in which an acceleration am of the movable body in the traveling area Ad is continuously dispersed or intermittently dispersed as shown in FIG. 7 based on the acquired or stored information of the sensor system 4, the communication system 5, and the map database 7. The speed distribution Dv and the acceleration distribution Da provide an overall ratio or the number as the frequency of the movable body taking the target speed vm or acceleration am. Therefore, the speed distribution Dv and the acceleration distribution Da are advisable to be acquired using, for example, the latest traffic information or the like accumulated in the external center as unique data for each traveling area Ad.

The distribution acquisition block 100 in S102 acquires, as an upper limit time tm, a larger one of a critical gap tc of the movable body in the traveling area Ad and a recognition required time ts of the host vehicle 2 in the traveling area Ad as shown in Mathematical 1 and FIG. 5.

$$tm=\max(tc,ts) \qquad \text{[Mathematical 1]}$$

Here, for example, as shown in FIGS. 8 to 12, the critical gap tc means a gap in which the probability of a movable body on the side of changing the traveling track executing the track change and the probability of the movable body on the side of changing the traveling track forgoing the track change are equal in a track intersecting scene such as intersection entry, merging, lane change, or the like in which the traveling tracks of a plurality of mobile bodies intersect each other. In FIGS. 8 to 12, the movable body on the side of changing the traveling track is drawn as the host vehicle 2, and a movable body on the side of forming a gap is drawn as the target movable body 3.

Figures 12, 13:
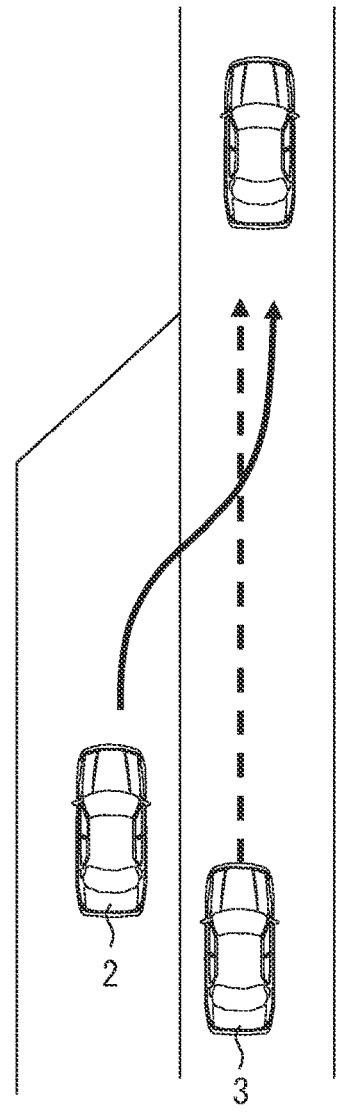
FIG. 12 is a schematic diagram showing a track-intersecting scene according to one embodiment.
FIG. 13 is a characteristic table showing a critical gap according to one embodiment.

Therefore, the critical gap tc is advisable to be acquired as illustrated in FIG. 13 using, for example, the latest gap acceptance information accumulated in the external center. In addition, the critical gap tc is advisable to be forced to a value of 0 when no track intersecting scene is assumed in the host vehicle 2.

On the other hand, the recognition required time ts means the maximum time during which the host vehicle 2 needs to recognize the target movable body 3 in the traveling area Ad. Therefore, the recognition required time ts is advisable to be acquired using, for example, route plan information in the host vehicle 2. In addition, the recognition required time ts is advisable to be set to, for example, a time until the host vehicle 2 starts a track change from the present in a track intersecting scene.

As shown in FIG. 5, the distribution acquisition block 100 in S102 acquires the probability distribution Dp corresponding to the traveling area Ad within a moving distance range ΔL in which the host vehicle 2 moves during the period between the present and the upper limit time tm. Here, the probability distribution Dp indicates a dispersion situation of the overall ratio or the number in which the target movable body 3 is present with respect to the distance Lh from the host vehicle 2. That is, the probability distribution Dp provides a dispersed overall ratio or number as the existence probability of the target movable body 3 that depends on the distance Lh. Therefore, the probability distribution Dp is acquired by composing the speed distribution Dv and the acceleration distribution Da so as to satisfy Mathematical 2 with the upper limit time tm as a variable.

$$\Delta L=\int_0^{tm}(V+a\cdot t)dt \qquad \text{[Mathematical 2]}$$

Figure 14:
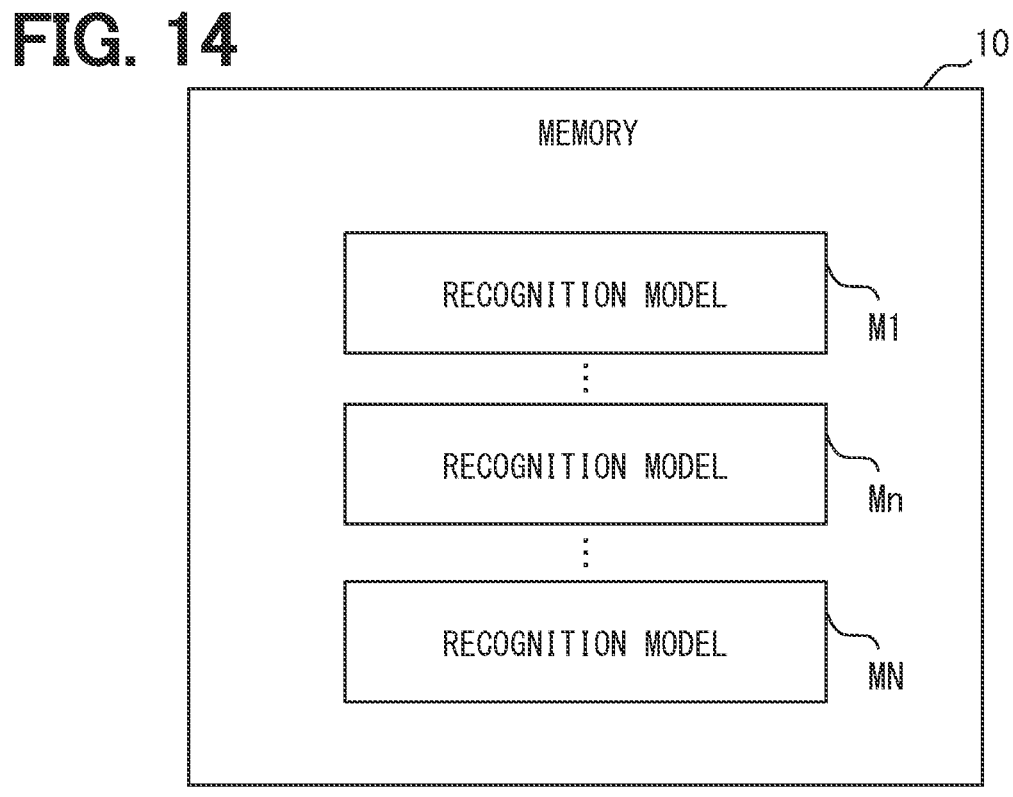
FIG. 14 is a block diagram showing a plurality of recognition models according to one embodiment.

In S103 of the processing flow shown in FIG. 4, the recognition rate acquisition block 110 acquires the recognition rate of recognizing the target movable body 3 in the traveling area Ad for each of a plurality of recognition models Mn. Here, each recognition model Mn is stored in the memory 10 as shown in FIG. 14 as a rule model (that is, the recognition logic) or a machine learning model for recognizing the target movable body 3 according to the traveling scene in the traveling area Ad. The suffix n in the symbol Mn means an integer of 1 to N as an index for identifying each of the N recognition models Mn.

Figure 15:
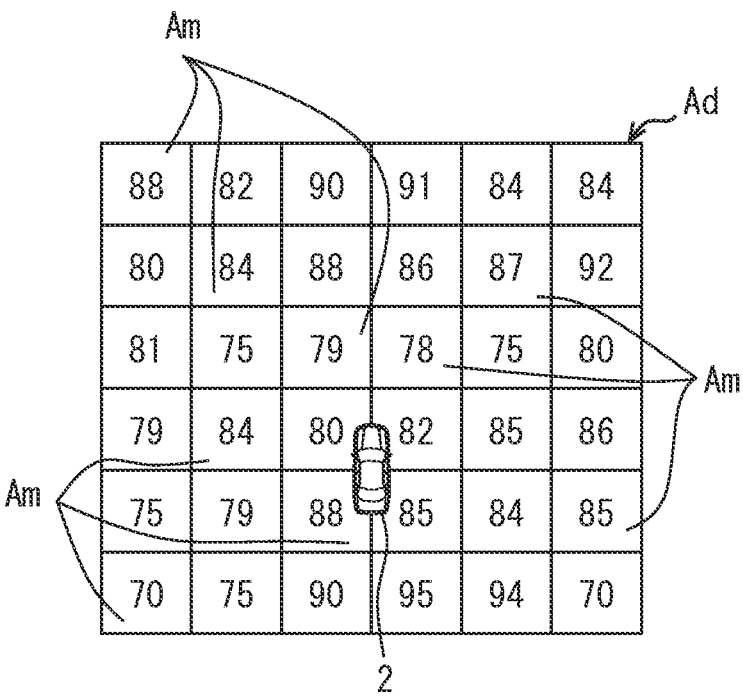
FIG. 15 is a schematic diagram for illustrating a recognition rate according to one embodiment.

Specifically, each recognition model Mn defines a recognition rate for each mesh area (that is, also referred to as a grid) Am obtained by dividing the traveling area Ad into a plurality of rectangular grids as shown in FIG. 15, on the left and right in the lateral direction and front and rear in the longitudinal direction of the host vehicle 2. The shape of each mesh area Am may be set to a shape other than the rectangular grid shape as long as a gap area does not occur between the mesh areas Am. In FIG. 15, the numerical values in the respective mesh areas Am represent recognition rates.

As shown in FIG. 16, the recognition rate defined for each mesh area Am in each recognition model Mn of the present embodiment includes at least one type out of matching degrees TP and TN between the real world and the recognition and mismatching degrees FP and FN between the real world and the recognition. Here, the matching degree TP (true positive) is a recognition success rate at which the presence of the target movable body 3 in the real world is matched with the presence of the recognition result. The matching degree TN (true negative) is a recognition success rate at which the absence of the target movable body 3 in the real world is matched with the absence of the recognition result. The mismatching degree FP (false positive) is a false recognition rate at which the absence of the target movable body 3 in the real world is mismatched with the presence of the recognition result. The mismatching degree FN (false negative) is a false recognition rate at which the presence of the target movable body 3 in the real world is mismatched with the absence of the recognition result.

In S104 of the processing flow shown in FIG. 4, the fusion block 120 acquires the recognition data based on each recognition model Mn based on the acquired or stored information of the sensor system 4, the communication system 5, and the map database 7. The recognition data by each recognition model Mn is acquired as data related to the target movable body 3, including at least one type out of, for example, a position, a speed, a shape, a type, a degree of recognition confidence (that is, the recognition reliability), and the like.

Figure 17:
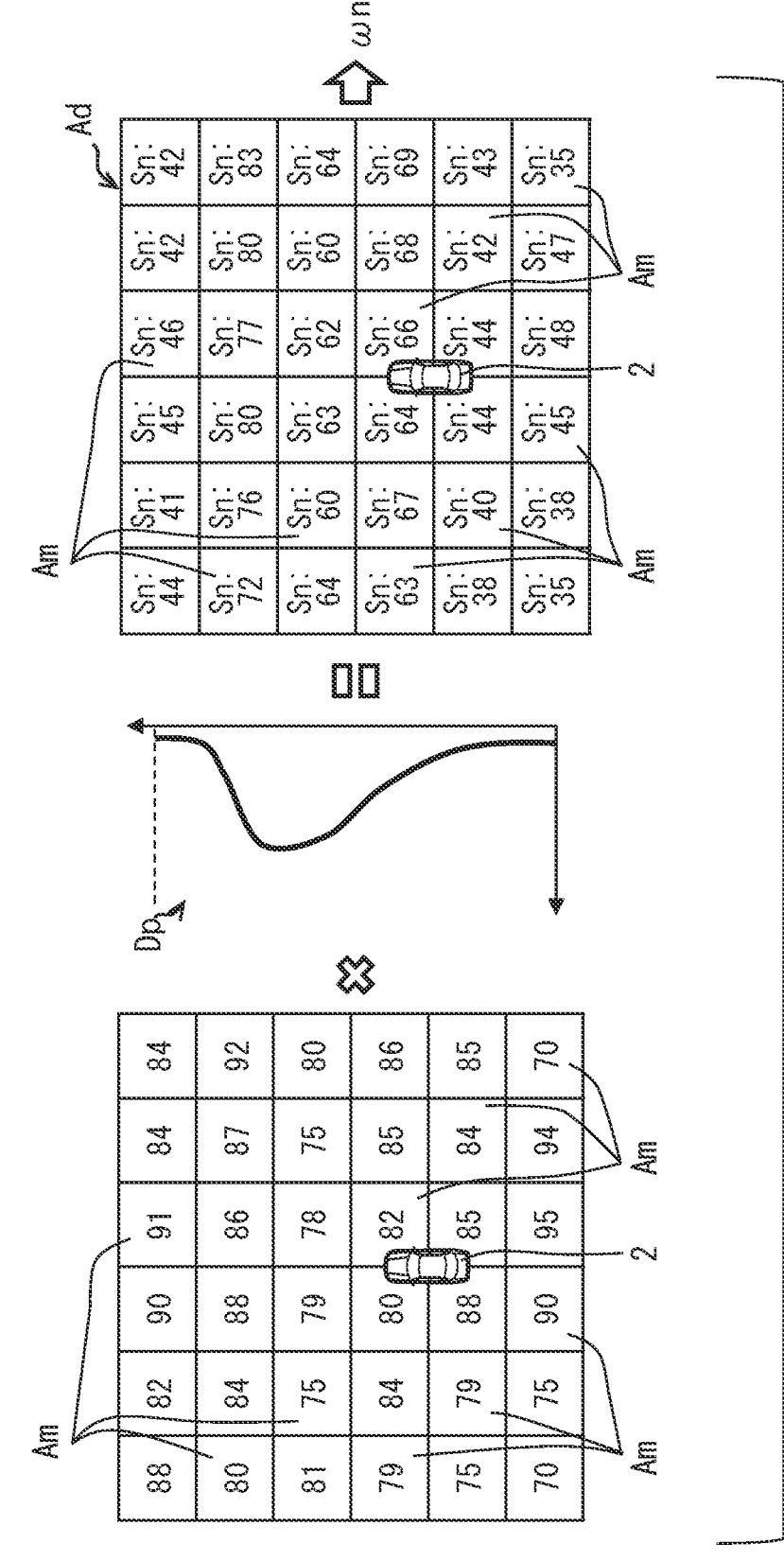
FIG. 17 is a characteristic table for illustrating a recognition score according to one embodiment.

In step S105 of the processing flow, the fusion block 120 fuses the recognition data by each recognition model Mn according to a fusion rate ωn based on a recognition score Sn correlated with the recognition rate and probability distribution Dp as shown in FIG. 17 for each recognition model Mn. The suffix n in the signs Sn and ωn also means an integer of 1 to N as an index for identifying the recognition score Sn and the fusion rate ωn corresponding to each of the N recognition models Mn.

Specifically, the fusion block 120 in S105 corrects the recognition rate for each recognition model Mn with the probability distribution Dp to acquire the recognition score Sn for each recognition model Mn. At this time, the correction of acquiring the recognition score Sn is achieved by multiplying the existence probability of the target movable body 3 that depends on the distance Lh in the probability distribution Dp by the recognition rate for each recognition model Mn as shown in FIG. 17.

Therefore, in the plurality of mesh areas Am in which the distance Lh from the host vehicle 2 to the area center location is within the moving distance range ΔL of the probability distribution Dp, the recognition score Sn is acquired which is obtained by correcting the recognition rate for each recognition model Mn by multiplying the distance Lh by the existence probability. Here, when the recognition rate for each recognition model Mn includes a plurality of types out of the matching degrees TP and TN and the mismatching degrees FP and FN, the existence probability is multiplied for each type. On the other hand, when the recognition rate for each recognition model Mn includes one type out of the matching degrees TP and TN and the mismatching degrees FP and FN, the existence probability is multiplied for the one type. However, in at least one mesh area Am in which the distance Lh from the host vehicle 2 to the area center location is outside the moving distance range ΔL of the probability distribution Dp, acquisition of the recognition score Sn for each recognition model Mn is stopped.

The fusion block 120 in S105 optimizes the fusion rate ωn for each of the recognition models Mn based on the recognition score Sn acquired for each of the recognition models Mn. At this time, regarding the recognition score Sn for each mesh area Am in which the distance Lh to the area center location is within the moving distance range ΔL, for example, a total sum value, an average value, or the like in the mesh area Am is used as the score representative value S^n (see FIG. 18 described below) for each recognition model Mn. The suffix n in the symbol S^n also means an integer of 1 to N as an index for identifying the score representative value S^n corresponding to each of the N recognition models Mn.

Figures 18, 19:
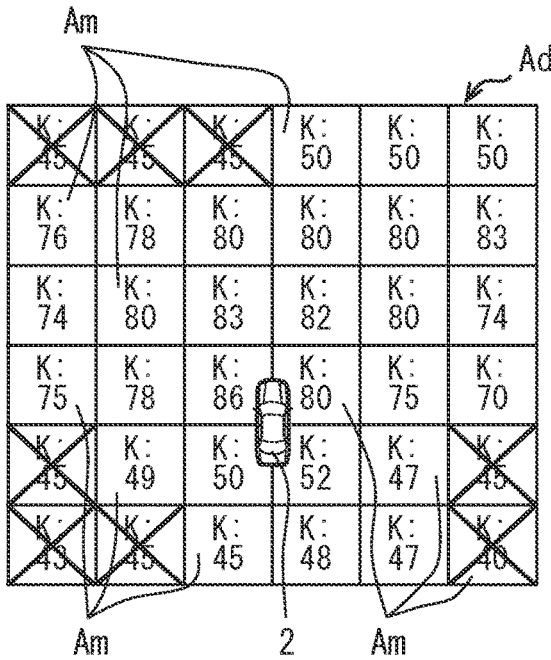
FIG. 18 is a characteristic table for illustrating optimization operation of a fusion rate according to one embodiment.
FIG. 19 is a schematic diagram for illustrating a constraint of an operational design domain according to one embodiment.

Therefore, the fusion block 120 in S105 defines Mathematical 3 in which the score representative value S^n for each recognition model Mn is weighted by the fusion rate ωn for each recognition model Mn to obtain a weighted average J in FIG. 18. Under this definition, any one of operations C1 to C7 shown in FIG. 18 is adopted as the optimization operation of the fusion rate ωn using Mathematical 3.

$$J = \Sigma \omega n \cdot S\hat{}n \qquad \text{[Mathematical 3]}$$

The operation C1 optimizes the fusion rate ωn so that the weighted average J(TP+TN) using the score representative value S^n of the sum of the recognition scores Sn correlated with the respective matching degrees TP and TN is maximized. Alternatively, the operation C1 optimizes the fusion rate ωn so that the inverse of the weighted average J(TP+TN) using the score representative value S^n of the sum of the recognition scores Sn correlated with the respective matching degrees TP and TN is minimized.

The operation C2 optimizes the fusion rate ωn so that the inverse of the weighted average J(FP+FN) using the score representative value S^n of the sum of the recognition scores Sn correlated with the respective mismatching degrees FP and FN is maximized. Alternatively, the operation C2 optimizes the fusion rate ωn so that the weighted average J(FP+FN) using the score representative value S^n of the sum of the recognition scores Sn correlated with the respective mismatching degrees FP and FN is minimized.

The operation C3 optimizes the fusion rate ωn so that the inverse of the weighted average J(FP) using the score representative value S^n of the recognition scores Sn correlated with the mismatching degree FP is maximized. Alternatively, the operation C3 optimizes the fusion rate ωn so that the weighted average J(FP) using the score representative value S^n of the recognition scores Sn correlated with the mismatching degree FP is minimized.

The operation C4 optimizes the fusion rate ωn so that the inverse of the weighted average J(FN) using the score representative value S^n of the recognition scores Sn correlated with the mismatching degree FN is maximized. Alternatively, the operation C4 optimizes the fusion rate ωn so that the weighted average J(FN) using the score representative value S^n of the recognition scores Sn correlated with the mismatching degree FN is minimized.

The operation C5 optimizes the fusion rate ωn so that the total sum of the weighted average J(TP+TN) using the score representative value S^n of the sum of the recognition scores Sn correlated with the respective matching degrees TP and TN and the inverse of the weighted average J(FP+FN) using the score representative value S^n of the sum of the recognition scores Sn correlated with the respective mismatching degrees FP and FN is maximized. Alternatively, the operation C5 optimizes the fusion rate ωn so that the total sum of the inverse of the weighted average J(TP+TN) using the score representative value S^n of the sum of the recognition scores Sn correlated with the respective matching degrees TP and TN and the weighted average J(FP+FN) using the score representative value S^n of the sum of the recognition scores Sn correlated with the respective mismatching degrees FP and FN is minimized.

The operation C6 optimizes the fusion rate ωn so that the total sum of the weighted average J(TP+TN) using the score representative value S^n of the sum of the recognition scores Sn correlated with the respective matching degrees TP and TN and the inverse of the weighted average J(FP) using the score representative value S^n of the recognition score Sn correlated with the mismatching degree FP is maximized. Alternatively, the operation C6 optimizes the fusion rate ωn so that the total sum of the inverse of the weighted average J(TP+TN) using the score representative value S^n of the sum of the recognition scores Sn correlated with the respective matching degrees TP and TN and the weighted average J(FP) using the score representative value S^n of the recognition score Sn correlated with the mismatching degree FP is minimized.

The operation C7 optimizes the fusion rate ωn so that the total sum of the weighted average J(TP+TN) using the score representative value $\hat{S}n$ of the sum of the recognition scores Sn correlated with the respective matching degrees TP and TN and the inverse of the weighted average J(FN) using the score representative value $\hat{S}n$ of the recognition score Sn correlated with the mismatching degree FN is maximized. Alternatively, the operation C7 optimizes the fusion rate $\omega n$ so that the total sum of the inverse of the weighted average J(TP+TN) using the score representative value $\hat{S}n$ of the sum of the recognition scores Sn correlated with the respective matching degrees TP and TN and the weighted average J(FN) using the score representative value $\hat{S}n$ of the recognition score Sn correlated with the mismatching degree FN is minimized.

The fusion block 120 in S105 performs fusion into integrated data by weighting the recognition data by each recognition model Mn with the optimized fusion rate $\omega n$. At this time, for example, when the recognition data by each recognition model Mn includes the position coordinates of the target movable body 3, the position coordinates by each recognition model Mn are weighted with the fusion rate $\omega n$, so that the position coordinates after the weighted average is advisable to be output as integrated data.

In addition, for example, when the recognition data by each recognition model Mn includes the degree of recognition confidence for the target movable body 3 and other types of data, the fusion rate $\omega n$ of the recognition model Mn in which the degree of recognition confidence has decreased to outside the allowable range may be forced to a value of 0. Here, in the latter exemplification, in the recognition model Mn other than the recognition model Mn in which the degree of recognition confidence has decreased, the fusion rate $\omega n$ is normalized, so that other types of data are advisable to be fused. As described above, the other types of data acquired by the recognition model Mn having a low degree of recognition confidence may be excluded from the fusion to the integrated data regardless of the optimized fusion rate $\omega n$.

The fusion block 120 in S105 may store at least one of the optimized fusion rate $\omega n$ and the recognition data fused by the fusion rate $\omega n$ in the memory 10 in association with the time stamp. The fusion block 120 in S105 may transmit at least one of the optimized fusion rate $\omega n$ and the recognition data fused by the fusion rate $\omega n$ as information associated with the time stamp to an external server through the communication system 5 to cause the external server to accumulate the information. The fusion block 120 in S105 may display and output the recognition data fused by the optimized fusion rate $\omega n$ from the information presentation system 6.

In S106 of the processing flow shown in FIG. 4, the constraint block 130 defines Mathematical 4 in which the weighted average K in FIG. 19 is obtained by weighting the recognition score Sn for each recognition model Mn, the recognition score Sn classified by each mesh area Am, with the fusion rate $\omega n$ for each optimized recognition model Mn. Under this definition, regarding an operational design domain (ODD) for the host vehicle 2 in the automated driving mode, the constraint block 130 in S105 sets a constraint based on the weighted average K. At this time, the mesh area Am in which the weighted average K using the recognition score Sn correlated with at least one of the matching degrees TP and TN and the mismatch degrees FP and FN is out of the set range is excluded from the ODD as illustrated by adding a cross mark in FIG. 19 as the constraint target.

$$K = \Sigma \omega n \cdot Sn \qquad \text{[Mathematical 4]}$$

Here, the weighted average K using the recognition score Sn correlated with at least one of the matching degrees TP and TN becomes a constraint trigger of the mesh area Am when the weighted average K decreases to the outside of the allowable range on the matching degrees TP and TN side. On the other hand, the weighted average K using the recognition score Sn correlated with at least one of the mismatching degrees FP and FN becomes a constraint trigger of the mesh area Am when the weighted average K increases to the outside of the allowable range on the mismatching degrees FP and FN side.

The actions and effects of the present embodiment described above will be described below.

According to the present embodiment, the probability distribution Dp of the target movable body 3 being present with respect to the distance Lh from the host vehicle 2 is acquired according to the traveling area Ad of the host vehicle 2. Therefore, in the present embodiment, according to the fusion rate $\omega n$ based on the recognition score Sn correlated with the recognition rate and above-described acquired probability distribution Dp for each of the plurality of recognition models Mn that recognize the target movable body 3, the recognition data by each of the recognition models Mn is fused. According to this, even if the request recognition performance obtained according to the traveling area Ad changes, appropriate fusion can be achieved by following the fusion rate $\omega n$ adjusted to the recognition score Sn in which the probability distribution Dp can reflect the change. Therefore, the recognition accuracy of the target movable body 3 in the host vehicle 2 can be secured.

According to the present embodiment, the probability distribution Dp is acquired based on the speed distribution Dv and the acceleration distribution Da of the movable body in the traveling area Ad. According to this, even if the request recognition performance changes according to the speed distribution Dv and the acceleration distribution Da that affect the probability distribution Dp of the traveling area Ad, it is possible to achieve appropriate fusion by the fusion rate $\omega n$ adjusted to the recognition score Sn in which the change can be reflected. Therefore, the recognition accuracy of the target movable body 3 in the host vehicle 2 can be enhanced.

According to the present embodiment, on the larger side out of the critical gap tc of the movable body in the traveling area Ad and the recognition required time ts of the host vehicle 2 in the traveling area Ad, the probability distribution Dp within the moving distance range $\Delta L$ in which the host vehicle 2 moves is acquired. According to this, even if the request recognition performance changes according to the probability distribution Dp limited within the moving distance range $\Delta L$ on the safer side out of the critical gap tc and the recognition required time ts, appropriate fusion can be achieved by the fusion rate $\omega n$ adjusted to the recognition score Sn in which the change can be reflected. Therefore, the recognition accuracy of the target movable body 3 in the host vehicle 2 can be secured in a processing time as short as possible.

According to the present embodiment, the fusion rate $\omega n$ is optimized based on the recognition score Sn for each recognition model Mn obtained by correcting, with the probability distribution Dp, the recognition rate that is at least one of the matching degrees TP and TN of recognition with respect to reality. According to this, the fusion rate $\omega n$ can be optimized so that matching of the recognition with the reality after fusion is secured. Therefore, the recognition accuracy of the target movable body 3 in the host vehicle 2 can be secured with high accuracy.

According to the present embodiment, the fusion rate ωn is optimized based on the recognition score Sn for each recognition model Mn obtained by correcting, with the probability distribution Dp, the recognition rate that is at least one of the mismatching degrees FP and FN of recognition with respect to reality. According to this, the fusion rate ωn can be optimized so that mismatching of the recognition with the reality after fusion is reduced. Therefore, the recognition accuracy of the target movable body 3 in the host vehicle 2 can be secured with high accuracy.

According to the present embodiment, the fusion rate ωn is optimized based on the recognition score Sn for each recognition model Mn obtained by correcting the recognition rate with the existence probability that depends on the distance Lh from the host vehicle 2 in the probability distribution Dp. According to this, even if the required request recognition performance changes, appropriate fusion can be achieved by the fusion rate ωn adjusted to the recognition score Sn in which the change can be reflected according to the distance Lh in the traveling area Ad. Therefore, the recognition accuracy of the target movable body 3 can be secured over the traveling area Ad of the host vehicle 2.

According to the present embodiment, the fusion rate ωn is optimized based on the recognition score Sn for each recognition model Mn obtained by correcting the recognition rate classified by the mesh area Am obtained by dividing the traveling area Ad into a plurality of parts with the existence probability of the probability distribution Dp. According to this, the fusion rate ωn can be minutely optimized for the request recognition performance in each mesh area Am corresponding to the distance Lh from the host vehicle 2. Therefore, the recognition accuracy of the target movable body 3 over the traveling area Ad of the host vehicle 2 can be secured with high accuracy in a short time.

According to the present embodiment, the constraint of the ODD on the host vehicle 2 in the automated driving mode is set based on the weighted average K obtained by weighting the recognition score Sn classified by each mesh area Am for each recognition model Mn with the fusion rate ωn. According to this, even if the request recognition performance obtained according to the traveling area Ad changes, it is possible to give the host vehicle 2 in the automated driving mode the constraint of the ODD adjusted to the recognition score Sn and the fusion rate ωn in which the change can be reflected. Therefore, in the host vehicle 2, in addition to the recognition accuracy of the target movable body 3, the setting accuracy of the ODD can also be secured.

Other Embodiments

Although one embodiment has been described above, the present disclosure is not to be construed as being limited to the embodiment of the description, and can be applied to various embodiments within the scope not departing from the gist of the present disclosure.

In a modification, the dedicated computer constituting the processing system 1 may include at least one out of a digital circuit and an analog circuit as a processor. Here, the digital circuit is at least one type out of, for example, an application-specific integrated circuit (ASIC), a field programmable gate array (FPGA), a system on a chip (SOC), a programmable gate array (PGA), a complex programmable logic device (CPLD), and the like. In addition, such a digital circuit may include a memory storing a program.

In S102 by the distribution acquisition block 100 of a modification, the moving distance range ΔL may be limited to the distance range in which the host vehicle 2 moves in the critical gap tc. In S102 by the distribution acquisition block 100 of a modification, the moving distance range ΔL may be limited to the distance range in which the host vehicle 2 moves in the recognition required time ts. In S102 by the distribution acquisition block 100 of a modification, the moving distance range ΔL may be limited to a fixed value other than those of the modifications. In S102 by the distribution acquisition block 100 of a modification, the probability distribution Dp itself specific to each traveling area Ad may be acquired from, for example, an external center.

In S103 by the recognition rate acquisition block 110 of a modification, in at least a partial bearing centered on the host vehicle 2 in the traveling area Ad, the recognition rate continuously dispersed with respect to the distance Lh may be acquired for each recognition model Mn. In this case, in S105 by the fusion block 120, in at least a partial bearing centered on the host vehicle 2 in the traveling area Ad, the recognition score Sn continuously dispersed with respect to the distance Lh may be acquired for each recognition model Mn.

In S103 by the recognition rate acquisition block 110 of a modification, the recognition rate for each recognition model Mn may be acquired as a common value over the entire traveling area Ad. In this case, in S105 by the fusion block 120, the recognition score Sn for each recognition model Mn is acquired as a common value over the entire traveling area Ad.

In S105 by the fusion block 120 of a modification, optimization of the fusion rate ωn may be executed by combining a plurality of operations out of the operations C1 to C7. In a modification, S106 by the constraint block 130 may be omitted. In a modification, the host movable body to which the processing system 1 is applied may be, for example, an autonomous traveling robot or the like whose traveling can be remotely controlled.

In addition to the above-described embodiments, the above-described embodiments and modifications may be implemented in the form of a control device (for example, a control ECU or the like) having at least one processor 12 and at least one memory 10 of the processing system 1 as a processing device configured to be mountable on the host vehicle 2. In addition, the above-described embodiments and modifications may be implemented in the form of a semiconductor device (for example, a semiconductor chip or the like) having at least one processor 12 and at least one memory 10 of the processing system 1 as a processing device configured to be mountable on the host vehicle 2.

What is claimed is:

1. A processing system comprising a processor, the processing system configured to perform recognition-related processing related to recognition of a target movable body for a host movable body, wherein the processor is configured to execute:

acquiring a probability distribution of the target movable body being present with respect to a distance from the host movable body according to a traveling area of the host movable body;

acquiring a recognition rate of recognizing the target movable body for each of a plurality of recognition models; and fusing recognition data by each of the plurality of recognition models according to a fusion rate based on a recognition score correlated with the recognition rate and the probability distribution for each of the plurality of recognition models, wherein the acquiring of the probability distribution includes acquiring the probability distribution based on a speed distribution and an acceleration distribution of a movable body in the traveling area, and the acquiring of the probability distribution includes, between the larger of a critical gap of a movable body in the traveling area and a recognition required time of the host movable body in the traveling area, acquiring the probability distribution within a moving distance range in which the host movable body moves, wherein the processor is further configured to execute generating of a control signal for executing autonomous traveling control or driving support control of the host movable body based on the fused recognition data, and controlling the host movable body using the control signal to execute autonomous traveling control or driving support control of the host movable body.

2. The processing system according to claim 1, wherein the fusing of the recognition data includes optimizing the fusion rate based on the recognition score for each of the plurality of recognition models obtained by correcting, with the probability distribution, the recognition rate that is a matching degree of recognition with respect to reality.

3. The processing system according to claim 1, wherein the fusing of the recognition data includes optimizing the fusion rate based on the recognition score for each of the plurality of recognition models obtained by correcting, with the probability distribution, the recognition rate that is a mismatching degree of recognition with respect to reality.

4. The processing system according to claim 1, further comprising a storage medium, wherein the processor is configured to further execute storing the fusion rate in the storage medium.

5. A processing system comprising a processor, the processing system configured to perform recognition-related processing related to recognition of a target movable body for a host movable body, wherein the processor is configured to execute:

acquiring a probability distribution of the target movable body being present with respect to a distance from the host movable body according to a traveling area of the host movable body;

acquiring a recognition rate of recognizing the target movable body for each of a plurality of recognition models; and fusing recognition data by each of the plurality of recognition models according to a fusion rate based on a recognition score correlated with the recognition rate and the probability distribution for each of the plurality of recognition models, the fusing of the recognition data includes optimizing the fusion rate based on the recognition score for each of the plurality of recognition models obtained by correcting the recognition rate with an existence probability that depends on the distance in the probability distribution, wherein the processor is further configured to execute generating of a control signal for executing autonomous traveling control or driving support control of the host movable body based on the fused recognition data, and controlling the host movable body using the control signal to execute autonomous traveling control or driving support control of the host movable body.

6. The processing system according to claim 5, wherein the fusing of the recognition data includes optimizing the fusion rate based on the recognition score for each of the plurality of recognition models obtained by correcting, with the existence probability, the recognition rate classified by each of mesh areas obtained by dividing the traveling area into a plurality of pieces.

7. The processing system according to claim 6, wherein the processor is configured to further execute setting a constraint of an operational design domain on the host movable body in an automated driving mode based on a weighted average obtained by weighting the recognition score classified by each of the mesh areas, for each of the plurality of recognition models, with the fusion rate.

8. A processing system comprising a processor, the processing system configured to perform recognition-related processing related to recognition of a target movable body in a host movable body, wherein the processor is configured to execute:

acquiring a probability distribution of the target movable body being present with respect to a distance from the host movable body according to a traveling area of the host movable body;

acquiring a recognition rate that is at least one type out of a matching degree and a mismatching degree of recognition with respect to reality for each of a plurality of recognition models that recognize the target movable body; and fusing recognition data by each of the plurality of recognition models according to a fusion rate based on a recognition score correlated with the recognition rate and the probability distribution for each of the plurality of recognition models, wherein the acquiring of the probability distribution includes acquiring the probability distribution based on a speed distribution and an acceleration distribution of a movable body in the traveling area, and the acquiring of the probability distribution includes, between the larger of a critical gap of a movable body in the traveling area and a recognition required time of the host movable body in the traveling area, acquiring the probability distribution within a moving distance range in which the host movable body moves, wherein the processor is further configured to execute generating of a control signal for executing autonomous traveling control or driving support control of the host movable body based on the fused recognition data; and controlling the host movable body using the control signal to execute autonomous traveling control or driving support control of the host movable body.

9. A processing device comprising a processor, the processing device configured to be mounted on a host movable body, the processing device configured to perform recognition-related processing related to recognition of a target movable body in the host movable body, wherein the processor is configured to execute:

acquiring a probability distribution of the target movable body being present with respect to a distance from the host movable body according to a traveling area of the host movable body;

acquiring a recognition rate of recognizing the target movable body for each of a plurality of recognition models; and fusing recognition data by each of the plurality of recognition models according to a fusion rate based on a recognition score correlated with the recognition rate and the probability distribution for each of the plurality of recognition models, wherein the acquiring of the probability distribution includes acquiring the probability distribution based on a speed distribution and an acceleration distribution of a movable body in the traveling area, and the acquiring of the probability distribution includes, between the larger of a critical gap of a movable body in the traveling area and a recognition required time of the host movable body in the traveling area, acquiring the probability distribution within a moving distance range in which the host movable body moves, wherein the processor is further configured to execute:

generating of a control signal for executing autonomous traveling control or driving support control of the host movable body based on the fused recognition data; and controlling the host movable body using the control signal to execute autonomous traveling control or driving support control of the host movable body.

10. A processing device comprising a processor, the processing device configured to be mounted on a host movable body, the processing device configured to perform recognition-related processing related to recognition of a target movable body in the host movable body, wherein the processor is configured to execute:

acquiring a probability distribution of the target movable body being present with respect to a distance from the host movable body according to a traveling area of the host movable body;

acquiring a recognition rate that is at least one type out of a matching degree and a mismatching degree of recognition with respect to reality for each of a plurality of recognition models that recognize the target movable body; and fusing recognition data by each of the plurality of recognition models according to a fusion rate based on a recognition score correlated with the recognition rate and the probability distribution for each of the plurality of recognition models, wherein the acquiring of the probability distribution includes acquiring the probability distribution based on a speed distribution and an acceleration distribution of a movable body in the traveling area, and the acquiring of the probability distribution includes, between the larger of a critical gap of a movable body in the traveling area and a recognition required time of the host movable body in the traveling area, acquiring the probability distribution within a moving distance range in which the host movable body moves, wherein the processor is further configured to execute:

generating of a control signal for executing autonomous traveling control or driving support control of the host movable body based on the fused recognition data; and controlling the host movable body using the control signal to execute autonomous traveling control or driving support control of the host movable body.

11. A processing method to be executed by a processer for performing recognition-related processing related to recognition of a target movable body in a host movable body, the processing method comprising:

acquiring a probability distribution of the target movable body being present with respect to a distance from the host movable body according to a traveling area of the host movable body;

acquiring a recognition rate of recognizing the target movable body for each of a plurality of recognition models; and fusing recognition data by each of the plurality of recognition models according to a fusion rate based on a recognition score correlated with the recognition rate and the probability distribution for each of the plurality of recognition models, wherein the acquiring of the probability distribution includes acquiring the probability distribution based on a speed distribution and an acceleration distribution of a movable body in the traveling area, and the acquiring of the probability distribution includes, between the larger of a critical gap of a movable body in the traveling area and a recognition required time of the host movable body in the traveling area, acquiring the probability distribution within a moving distance range in which the host movable body moves, wherein the processing method further comprises:

generating a control signal for executing autonomous traveling control or driving support control of the host movable body based on the fused recognition data; and controlling the host movable body using the control signal to execute autonomous traveling control or driving support control of the host movable body.

12. A processing method to be executed by a processer for performing recognition-related processing related to recognition of a target movable body in a host movable body, the processing method comprising:

acquiring a probability distribution of the target movable body being present with respect to a distance from the host movable body according to a traveling area of the host movable body;

acquiring a recognition rate that is at least one type out of a matching degree and a mismatching degree of recognition with respect to reality for each of a plurality of recognition models that recognize the target movable body; and fusing recognition data by each of the plurality of recognition models according to a fusion rate based on a recognition score correlated with the recognition rate and the probability distribution for each of the plurality of recognition models, wherein the acquiring of the probability distribution includes acquiring the probability distribution based on a speed distribution and an acceleration distribution of a movable body in the traveling area, and the acquiring of the probability distribution includes, between the larger of a critical gap of a movable body in the traveling area and a recognition required time of the host movable body in the traveling area, acquiring the probability distribution within a moving distance range in which the host movable body moves, wherein the processing method further comprises:

generating a control signal for executing autonomous traveling control or driving support control of the host movable body based on the fused recognition data; and controlling the host movable body using the control signal to execute autonomous traveling control or driving support control of the host movable body.

13. A processing system comprising a processor, the processing system configured to perform recognition-related processing related to recognition of a target movable body in a host movable body, wherein the processor is configured to execute:

acquiring a probability distribution of the target movable body being present with respect to a distance from the host movable body according to a traveling area of the host movable body;

acquiring a recognition rate that is at least one type out of a matching degree and a mismatching degree of recognition with respect to reality for each of a plurality of recognition models that recognize the target movable body; and fusing recognition data by each of the plurality of recognition models according to a fusion rate based on a recognition score correlated with the recognition rate and the probability distribution for each of the plurality of recognition models, wherein the fusing of the recognition data includes optimizing the fusion rate based on the recognition score for each of the plurality of recognition models obtained by correcting the recognition rate with an existence probability that depends on the distance in the probability distribution, wherein the processor is further configured to execute:

generating of a control signal for executing autonomous traveling control or driving support control of the host movable body based on the fused recognition data; and controlling the host movable body using the control signal to execute autonomous traveling control or driving support control of the host movable body.

14. A processing device comprising a processor, the processing device configured to be mounted on a host movable body, the processing device configured to perform recognition-related processing related to recognition of a target movable body in the host movable body, wherein the processor is configured to execute:

acquiring a probability distribution of the target movable body being present with respect to a distance from the host movable body according to a traveling area of the host movable body;

acquiring a recognition rate of recognizing the target movable body for each of a plurality of recognition models; and fusing recognition data by each of the plurality of recognition models according to a fusion rate based on a recognition score correlated with the recognition rate and the probability distribution for each of the plurality of recognition models, wherein the fusing of the recognition data includes optimizing the fusion rate based on the recognition score for each of the plurality of recognition models obtained by correcting the recognition rate with an existence probability that depends on the distance in the probability distribution, wherein the processor is further configured to execute:

generating of a control signal for executing autonomous traveling control or driving support control of the host movable body based on the fused recognition data; and controlling the host movable body using the control signal to execute autonomous traveling control or driving support control of the host movable body.

15. A processing device comprising a processor, the processing device configured to be mounted on a host movable body, the processing device configured to perform recognition-related processing related to recognition of a target movable body in the host movable body, wherein the processor is configured to execute:

acquiring a probability distribution of the target movable body being present with respect to a distance from the host movable body according to a traveling area of the host movable body;

acquiring a recognition rate that is at least one type out of a matching degree and a mismatching degree of recognition with respect to reality for each of a plurality of recognition models that recognize the target movable body; and fusing recognition data by each of the plurality of recognition models according to a fusion rate based on a recognition score correlated with the recognition rate and the probability distribution for each of the plurality of recognition models, wherein the fusing of the recognition data includes optimizing the fusion rate based on the recognition score for each of the plurality of recognition models obtained by correcting the recognition rate with an existence probability that depends on the distance in the probability distribution, wherein the processor is further configured to execute:

generating of a control signal for executing autonomous traveling control or driving support control of the host movable body based on the fused recognition data; and controlling the host movable body using the control signal to execute autonomous traveling control or driving support control of the host movable body.

16. A processing method to be executed by a processer for performing recognition-related processing related to recognition of a target movable body in a host movable body, the processing method comprising:

acquiring a probability distribution of the target movable body being present with respect to a distance from the host movable body according to a traveling area of the host movable body;

acquiring a recognition rate of recognizing the target movable body for each of a plurality of recognition models; and fusing recognition data by each of the plurality of recognition models according to a fusion rate based on a recognition score correlated with the recognition rate and the probability distribution for each of the plurality of recognition models, wherein
the fusing of the recognition data includes optimizing the fusion rate based on the recognition score for each of the plurality of recognition models obtained by correcting the recognition rate with an existence probability that depends on the distance in the probability distribution,
wherein
the processing method further comprises:
    generating a control signal for executing autonomous traveling control or driving support control of the host movable body based on the fused recognition data; and
    controlling the host movable body using the control signal to execute autonomous traveling control or driving support control of the host movable body.

17. A processing method to be executed by a processer for performing recognition-related processing related to recognition of a target movable body in a host movable body, the processing method comprising:
    acquiring a probability distribution of the target movable body being present with respect to a distance from the host movable body according to a traveling area of the host movable body;
    acquiring a recognition rate that is at least one type out of a matching degree and a mismatching degree of recognition with respect to reality for each of a plurality of recognition models that recognize the target movable body; and
fusing recognition data by each of the plurality of recognition models according to a fusion rate based on a recognition score correlated with the recognition rate and the probability distribution for each of the plurality of recognition models,
wherein
the fusing of the recognition data includes optimizing the fusion rate based on the recognition score for each of the plurality of recognition models obtained by correcting the recognition rate with an existence probability that depends on the distance in the probability distribution,
wherein
the processing method further comprises:
    generating a control signal for executing autonomous traveling control or driving support control of the host movable body based on the fused recognition data; and
    controlling the host movable body using the control signal to execute autonomous traveling control or driving support control of the host movable body.

* * * * *